United States Patent
Vreys et al.

(10) Patent No.: US 12,173,097 B2
(45) Date of Patent: Dec. 24, 2024

(54) IONOMERS AND/OR CHAIN EXTENDED/BRANCHED COPOLYMERS OF IMPACT MODIFIED VINYLIDENE AROMATIC MONOMER AND UNSATURATED COMPOUNDS

(71) Applicant: TRINSEO EUROPE GMBH, Pfaeffikon (CH)

(72) Inventors: Mark Georges Vreys, Oostakker (BE); Claude T. E. Van Nuffel, Oostakker (BE); Abidin Balan, Breda (NL)

(73) Assignee: TRINSEO EUROPE GMBH, Pfaeffikon (CH)

(*) Notice: Subject to any disclaimer, the term of this patent is extended or adjusted under 35 U.S.C. 154(b) by 0 days.

(21) Appl. No.: 18/691,751

(22) PCT Filed: Sep. 14, 2022

(86) PCT No.: PCT/EP2022/075518
§ 371 (c)(1),
(2) Date: Mar. 13, 2024

(87) PCT Pub. No.: WO2023/041576
PCT Pub. Date: Mar. 23, 2023

(65) Prior Publication Data
US 2024/0327555 A1    Oct. 3, 2024

(30) Foreign Application Priority Data
Sep. 14, 2021 (EP) .................................. 21196543

(51) Int. Cl.
*C08F 212/08*   (2006.01)
*C08F 2/38*     (2006.01)
(Continued)

(52) U.S. Cl.
CPC .............. *C08F 212/08* (2013.01); *C08F 2/38* (2013.01); *C08F 220/06* (2013.01);
(Continued)

(58) Field of Classification Search
CPC .................. C08F 212/08; C08F 220/06; C08F 220/325
See application file for complete search history.

(56) References Cited

U.S. PATENT DOCUMENTS 2,727,884 A    12/1955   McDonald
3,243,481 A    3/1966    Ruffing
(Continued)

FOREIGN PATENT DOCUMENTS

BE    887080 A       7/1981
CA    2618201 C  *   8/2012   ........... G03G 9/0804
(Continued)

OTHER PUBLICATIONS

Extended European Search Report in co-pending European Application No. EP21196543 dated Mar. 15, 2022 (6 pages).
(Continued)

*Primary Examiner* — Mark S Kaucher
(74) *Attorney, Agent, or Firm* — Young Basile Hanlon & MacFarlane, P.C.

(57) ABSTRACT

A composition includes one or more copolymers of one or more vinylidene aromatic monomers and one or more unsaturated compounds containing nucleophilic groups, and the copolymer has on average about 0.01 to about 15.0 percent by weight of nucleophilic groups pendant from the copolymer. The copolymer is chain extended and/or branched by one or more copolymers of one or more vinylidene aromatic monomers and one or more unsaturated compounds having electrophilic groups, or a portion of the chains of the copolymer of one or more vinylidene aromatic monomers and one or more nucleophilic groups are cross-
(Continued)

linked with other chains of the copolymer of one or more vinylidene aromatic monomers and one or more nucleophilic groups by ionic bonding of anions formed from the pendant nucleophilic groups with a metal cation having a valence of 2 or greater or complexation between pendant acid groups and metal oxides.

20 Claims, 2 Drawing Sheets

(51) Int. Cl.
*C08F 220/06* (2006.01)
*C08F 220/32* (2006.01)
*C08F 279/02* (2006.01)
*F25D 23/06* (2006.01)

(52) U.S. Cl.
CPC ........ *C08F 220/325* (2020.02); *C08F 279/02* (2013.01); *F25D 23/066* (2013.01)

(56) References Cited

U.S. PATENT DOCUMENTS

| | | |
|---|---|---|
| 3,660,535 A | 5/1972 | Finch |
| 4,239,863 A | 12/1980 | Bredeweg |
| 4,572,819 A | 2/1986 | Priddy et al. |
| 4,585,825 A | 4/1986 | Wesselmann |
| 4,666,987 A | 5/1987 | Burmester et al. |
| 5,412,036 A | 5/1995 | Traugott et al. |
| 5,446,103 A | 8/1995 | Traugott et al. |
| 5,716,581 A | 2/1998 | Tirrell et al. |
| 5,717,029 A | 2/1998 | Bonekamp et al. |
| 6,027,800 A | 2/2000 | Sheu |
| 10,018,406 B2 | 7/2018 | Liu et al. |
| 2002/0061974 A1 | 5/2002 | Sugden et al. |
| 2002/0107323 A1 | 8/2002 | Uzee et al. |
| 2011/0274900 A1 | 11/2011 | Megally et al. |
| 2014/0045961 A1 | 2/2014 | Welsh et al. |

FOREIGN PATENT DOCUMENTS

| | | |
|---|---|---|
| CN | 1986635 A | 6/2007 |
| CN | 110103547 A | 8/2019 |
| EP | 160974 A2 | 11/1985 |
| EP | 0412801 A1 | 2/1991 |
| EP | 579588 A2 | 1/1994 |
| EP | 747646 A1 | 12/1996 |
| EP | 2961781 A1 | 1/2016 |
| EP | 4147871 A1 | 3/2023 |
| EP | 4148076 A1 | 3/2023 |
| JP | S60181157 A | 9/1985 |
| JP | 2003072863 A | 3/2003 |
| JP | 2010254967 A | 11/2010 |
| JP | 2013226826 A | 11/2013 |
| JP | 2016222751 A | 12/2016 |
| JP | 2019052251 A | 4/2019 |
| JP | 2019206664 A1 | 12/2019 |
| JP | 2020015924 A1 | 1/2020 |
| WO | 1991015366 A1 | 10/1991 |
| WO | 9412551 A1 | 6/1994 |
| WO | 0148043 A1 | 7/2001 |
| WO | 2008134131 A1 | 11/2008 |
| WO | 2009012219 A3 | 5/2009 |
| WO | 2010027655 A1 | 3/2010 |
| WO | 2014131431 A1 | 9/2014 |
| WO | 2015076868 A1 | 5/2015 |
| WO | 2020115022 A1 | 6/2020 |
| WO | 2020115023 A1 | 6/2020 |

OTHER PUBLICATIONS

International Search Report and Written Opinion in co-pending International Application No. PCT/EP2022/075518 mailed Jan. 24, 2023 (11 pages).

Meister et al., "Commercial Processes for the Manufacture of Polystyrene", Modern Styrenic Polymers: Polystrenes and Styrenic Copolymers, 29 pages.

* cited by examiner

US 12,173,097 B2

IONOMERS AND/OR CHAIN EXTENDED/BRANCHED COPOLYMERS OF IMPACT MODIFIED VINYLIDENE AROMATIC MONOMER AND UNSATURATED COMPOUNDS

CROSS-REFERENCE TO RELATED APPLICATIONS

This application is a United States National Phase filing under 35 USC 371 of PCT Application PCT/EP2022/075518 filed Sep. 14, 2022, published as WO2023/041576, which claims priority from European Patent Application No. 21196543.9 filed Sep. 14, 2021, all of which are incorporated herein by reference in their entirety for all purposes.

TECHNICAL FIELD

This disclosure relates to ionomers and/or chain extended/branched copolymers of vinylidene aromatic monomers and unsaturated compounds containing impact modifiers. Disclosed are methods of preparing such ionomers and/or chain-extended/branched copolymers.

BACKGROUND

Polymers prepared from vinylidene aromatic monomers, such as styrene, are used in several polymeric systems, including foams, packaging (food packaging), medical, electronic, optical, appliance and automotive applications. In certain applications, vinylidene substituted aromatic monomers with high melt strength is desired. High melt strength facilitates enhanced processing of into the desired products. Polymers of vinylidene aromatic monomers containing impact modifiers have good environmental stress crack resistance properties. However, when the polymers of vinylidene substituted aromatic monomers are modified by rubbers to improve impact strength, other properties can suffer, like processability. Some references disclose preparing impact modified polymer systems containing copolymers of vinylidene aromatic monomers, such as WO2008134131A1, and EP 2961781. These references fail to disclose preparing polymers of vinylidene substituted aromatic monomers having good average molecular weight and excellent processability while retaining other advantageous properties. Polymers prepared from vinylidene aromatic monomers have been used in molded products such as refrigerator liners. Refrigerator producers desire to develop refrigerator liners which utilize recycle content. Impact modified vinylidene aromatic monomers, such as styrene, can be difficult to recycle.

Thus, there is a need for polymers containing impact modified vinylidene aromatic monomers which exhibit excellent extrusion-thermoforming properties, high melt strength, improved chemical resistance, and improved environmental stress crack resistance properties. There is a need for impact modified vinylidene aromatic monomers, such as styrene, which can enhance the use of recycled impact modified vinylidene aromatic monomers in molded structures, such as refrigerator liners, packaging appliances, and the like.

SUMMARY

Disclosed herein is a composition including one or more copolymers of one or more vinylidene aromatic monomers and one or more unsaturated compounds containing nucleophilic groups, wherein the copolymer has on average about 0.01 to about 15.0 percent by weight of nucleophilic groups pendant from the copolymer. The copolymer may be chain extended and or branched by one or more copolymers of one or more vinylidene aromatic monomers and one or more unsaturated compounds having electrophilic groups, or a portion of the chains of the copolymer of one or more vinylidene aromatic monomers and one or more nucleophilic groups are crosslinked with other chains of the copolymer of one or more vinylidene aromatic monomers and one or more nucleophilic groups by ionic bonding of anions formed from the pendant nucleophilic groups with a metal cation having a valence of 2 or greater or complexation between pendant acid groups and metal oxides. The composition may include one or more copolymers of one or more vinylidene aromatic monomers and one or more unsaturated compounds containing nucleophilic groups, wherein the copolymer may have on average about 0.02 to about 3.0 percent by weight of nucleophilic groups pendant from the copolymer. The copolymer may be chain extended and or branched by one or more copolymers of one or more vinylidene aromatic monomers and one or more unsaturated compounds having electrophilic groups. Disclosed is a composition containing one or more copolymers of one or more vinylidene aromatic monomers and one or more one or more unsaturated compounds containing nucleophilic groups, wherein the copolymer has about 0.01 to about 15.0 percent by weight of the one or more unsaturated compounds containing nucleophilic groups. The nucleophilic groups are pendant from the copolymer; and a portion of the chains of the copolymer of one or more vinylidene aromatic monomers and one or more unsaturated compounds containing nucleophilic groups may be crosslinked with other chains of the copolymer of one or more vinylidene aromatic monomers and one or more unsaturated acids by ionic bonding of anions formed from the pendant acid groups with a metal cation having a valence of 2 or greater or complexation between pendant acid groups and metal oxides. Disclosed are compositions having one or more copolymers of one or more vinylidene aromatic monomers and one or more unsaturated compounds containing nucleophilic groups, and the copolymer has on average about 0.01 to about 15.0 percent by weight of nucleophilic groups pendant from the copolymer. The copolymer may be chain extended and or branched by one or more copolymers of one or more vinylidene aromatic monomers and one or more unsaturated compounds having electrophilic groups in an amount sufficient to react with about 0.02 to about 3.0 percent by weight of nucleophilic groups pendant from the copolymer, and a portion of the chains of the copolymer of one or more vinylidene aromatic monomers and one or more nucleophilic groups are crosslinked with other chains of the copolymer of one or more vinylidene aromatic monomers and one or more nucleophilic groups by ionic bonding of anions formed from the pendant nucleophilic groups with a metal cation having a valence of 2 or greater or complexation between pendant acid groups and metal oxides.

The composition may have a content of the rubber impact modifier in about 6 percent by weight or greater based on the weight of the copolymer and the impact modifier. The composition may contain from about 20 to about 99.5 percent by weight of the copolymer and from about 6 to about 50 percent by weight of the impact modifier based on the weight of the composition. The composition may include an impact modifier that has a particle size of about 2 to about 10 microns. The composition may contain a rubber-based impact modifier and have a Mz+1 of about 600,000 to about 2,500,00 and a gel content of 30 or higher. The composition may exhibit a Brinkman Crosslink Index of from 0.6 to 0.8. The composition may have an elongational viscosity after 3 seconds at 200° C. of 75,000 Pa·s or greater. The monovinylidene aromatic monomer containing polymers which are impact modified by a rubber and exhibit resistance to environmental stress cracking may be branched polymers. The branching may be sufficient to provide a polymer which exhibits the properties of the thermoformed articles as disclosed herein. If the degree of branching is too low, they do not provide the elongational viscosity and chemical resistance properties, which are desired for the disclosed applications. If the degree of branching is too high, the elongational viscosity may be so high that the desired structures cannot be formed. The degree of branching impacts the $Mz+1$, which is in direct relation to the degree of branching. The polymers with the $Mz+1$ disclosed herein have an appropriate degree of branching.

The copolymer of the one or more vinylidene aromatic monomers and one or more unsaturated compounds containing nucleophilic groups may further include one or more (meth)acrylates, unsaturated nitriles or conjugated dienes. The nucleophilic groups may be a carboxylate, carboxylic acid, alcohol, phenol, amine, aniline, imidazole, tetrazole, thiol, boronic acid, glycol, hydrazine and hydroxyl amine groups, and the electrophilic groups may be one or more of epoxide, anhydride, imide, ester, acyl halide, acyl nitrile, aldehyde, ketone, isocyanate and isothiocyanate groups. The one or more nucleophilic groups may be acids including carboxylic acids, unsaturated aromatic acids, sulfonic acids, phosphorous based acids, boronic acids, or mixtures thereof. The weight average molecular weight of the copolymer of one or more vinylidene aromatic monomers and one or more unsaturated compounds containing nucleophilic groups may be substantially the same after the crosslinking is reversed as it is before crosslinking.

The metal may be one or more of transition metals, post transition metals, metalloids or alkaline earth metals. The equivalents ratio of metal ions to equivalents of anions formed from pendant nucleophilic groups on the copolymer may be from about 40:1 to about 1:40.

Disclosed herein is a structure comprising a sheet having a polymeric layer comprising a composition as disclosed herein. The sheet may have more than one layer and one of the outer most layer may comprise a composition as disclosed herein. The sheet may have three of more layers and one or both of the outer most layers comprises a composition.

The copolymer having vinylidene aromatic monomers has an elongation viscosity after 3 seconds at 200 degrees Celsius of greater than 75,000 Pa/s.

DETAILED DESCRIPTION

Figure 1:
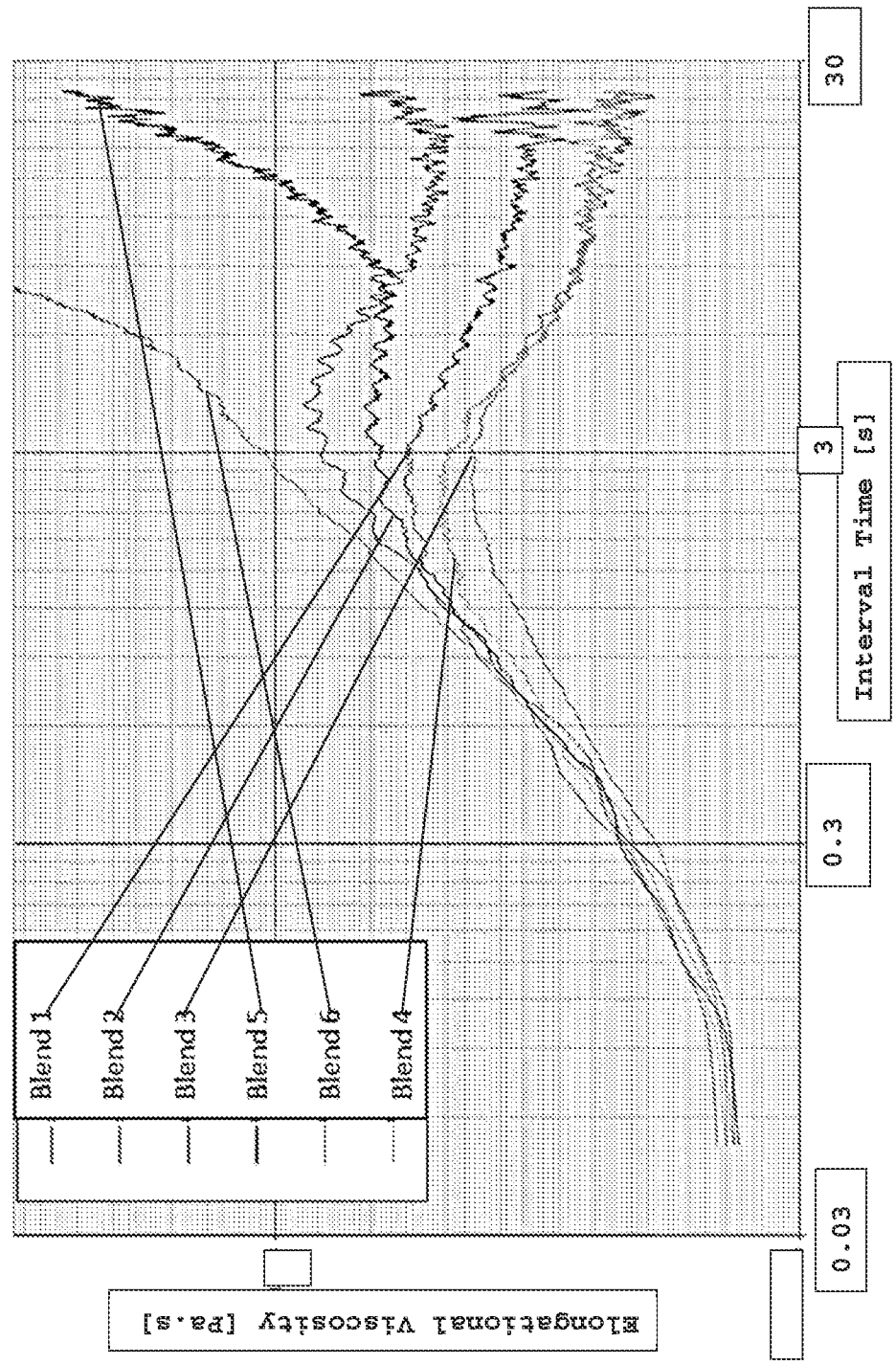
FIG. 1 is a graph of six blends of polymers showing elongational viscosity curves at 200 degrees C.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

One or more as used herein means that at least one, or more than one, of the recited components may be used as disclosed. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound. As used herein percent by weight or parts by weight refer to, or are based on, the weight of the compositions unless otherwise specified.

Chain-extended as used herein means that two or more of the subject copolymers are linked by another copolymer to form linear segments of the subject copolymers. The subject copolymers may be one or more copolymers of one or more vinylidene aromatic monomers and one or more unsaturated compounds containing a nucleophilic group. The linking copolymer may be one or more copolymers of one or more vinylidene aromatic monomers and one or more unsaturated compounds having electrophilic groups. Branched as used herein means that more than two of the subject copolymers are linked by another copolymer such that the subject polymers are formed having three or more connected chains that are not linear and form non-linear branches. The compositions disclosed may include polymer chains wherein a portion of the subject polymers are chain extended and a portion of the subject polymers are branched by the linking polymers.

Crosslinked as used herein means that a plurality of the subject copolymers are linked to other subject copolymers through ionic bonds of anions formed from the acid groups from the unsaturated acid with cations formed from the metals or by complexes of from the acid groups from the unsaturated acid with metal oxides wherein the metal salts and metal oxides that have at least two valences. Valence with respect to the metals means that the metals can form two cationic species that form bonds with anions or can complex with at least two acids. The subject copolymers may be one or more copolymers of one or more vinylidene aromatic monomers and one or more unsaturated compounds containing a nucleophilic group. Some of the subject copolymers may have two or more bonds to other subject copolymers. The number of the subject copolymers may have two or more bonds to other subject copolymers and overall crosslinks are chosen to provide the advantageous properties disclosed herein. As used herein un-crosslinked means that the subject polymers do not have multiple crosslinks such that the resulting polymer composition becomes insoluble in solvents, for instance methylene chloride at 23°. Insoluble means that a portion of the polymer composition is no longer soluble as described. Soluble means that the polymer is about 100 percent soluble at the described conditions.

The copolymers of one or more copolymers of one or more vinylidene aromatic monomers and one or more unsaturated compounds containing one or more nucleophilic groups are addition polymers formed by addition polymerization through unsaturated groups. The copolymers are chosen such that the concentration of nucleophilic groups present in the copolymers will chain extend or form branched copolymers when reacted with one or more copolymers of one or more vinylidene aromatic monomers and one or more unsaturated compounds having electrophilic groups polymers. The relative concentrations of nucleophilic groups and electrophilic groups in the reacted polymers are selected such that the copolymers react to form chain extended and/or branched polymers. If the concentration of both nucleophilic groups and electrophilic groups in the polymers is too high the resulting copolymers become crosslinked with multiple links between the reacted polymers. At least one of the two reacted polymers must have a limited number of groups to form chain-extended or branched copolymers. Chain extended and or branched polymers which are un-crosslinked are processable into desired products and provide certain advantages as discussed hereinbefore. There are known copolymers of one or more vinylidene aromatic monomers and one or more unsaturated compounds having electrophilic groups which have a significant concentration of electrophilic groups and copolymers of one or more vinylidene aromatic monomers and one or more unsaturated compounds containing one or more nucleophilic groups having a high concentration of nucleophilic groups. When one of the reacted copolymers has a high concentration of either nucleophilic or electrophilic groups then the other copolymer reacted with such copolymers should have a low concentration of nucleophilic groups or electrophilic groups to allow formation of chain extended and/or branched polymer chains. At least 50% of the formed polymer chains may be un-crosslinked.

The formed chain extended and/or branched copolymers may have polymodal molecular weight distributions. Polymodal means that the polymer mixture contains more than one molecular weight peak when the molecular weight is measured. This means that the mixture shows a number of molecular weight distribution peaks at multiples of the average molecular weight of the chain extended copolymers of one or more vinylidene aromatic monomers and one or more unsaturated compounds containing a nucleophilic group. The polymer molecular weight may be measured by gel permeation chromatography (GPC) using narrow molecular weight polystyrene standards and tetrahydrofuran (THF) as solvent, standard integrating software issued together with a UV-detector. All molecular weights are determined by GPC, by the same analysis (Mw, Mn, MWD, Mz, Mz+1, etc), molecular weights may be reported in units of g/mole or Dalton wherein 1 Dalton is equal to 1 g/mole.

There are several commercially available copolymers of one or more vinylidene aromatic monomers and one or more unsaturated compounds having electrophilic groups having relatively high concentrations of electrophilic groups. When these copolymers are used to chain extend and or branch copolymers of one or more vinylidene aromatic monomers and one or more unsaturated compounds containing nucleophilic groups, the concentration of the nucleophilic groups on the copolymer may be relatively low. The concentration of the nucleophilic groups on the one or more copolymers of one or more vinylidene aromatic monomers and one or more unsaturated compounds containing a nucleophilic group are chosen such that based on the concentration of electrophilic groups on the branched by one or more copolymers of one or more vinylidene aromatic monomers and one or more unsaturated compounds having electrophilic groups when the copolymers are reacted chain extended and or branched, un-crosslinked polymers are prepared. The concentration of the nucleophilic groups on the one or more copolymers of one or more vinylidene aromatic monomers and one or more unsaturated compounds containing a nucleophilic groups may be about 0.01 percent by weight of the copolymer or greater, 0.02 percent by weight of the copolymer or greater, about 0.04 percent by weight or greater about 0.05 percent by weight or greater, about 0.1 percent by weight or greater or about 0.2 percent by weight or greater. The concentration of the nucleophilic groups on the one or more copolymers of one or more vinylidene aromatic monomers and one or more unsaturated compounds containing nucleophilic groups may be about 15 percent by weight of the copolymer or less, about 10 percent by weight or less, about 5 percent by weight or less 3.0 percent by weight of the copolymer or less, about 1.5 percent by weight or less or about 0.5 percent by weight or less.

The concentration of the electrophilic groups on the one or more copolymers of one or more vinylidene aromatic monomers and one or more unsaturated compounds containing electrophilic groups are chosen such that based on the concentration of nucleophilic groups on the one or more copolymers of one or more vinylidene aromatic monomers and one or more unsaturated compounds having nucleophilic groups when the copolymers are reacted chain extended and or branched, un-crosslinked polymers are prepared. The concentration of the electrophilic groups on the one or more copolymers of one or more vinylidene aromatic monomers and one or more unsaturated compounds containing an electrophilic group may be about 10 percent by weight of the copolymer or greater, about 15 percent by weight or greater or about 20 percent by weight or greater. The concentration of the electrophilic groups on the one or more copolymers of one or more vinylidene aromatic monomers and one or more unsaturated compounds containing an electrophilic group may be about 60 percent by weight of the copolymer or less, about 50 percent by weight or less or about 40 percent by weight or less.

The equivalents ratio of electrophilic groups on the one or more copolymers of one or more vinylidene aromatic monomers and one or more unsaturated compounds containing an electrophilic group to the nucleophilic groups on the copolymers of one or more vinylidene aromatic monomers and one or more unsaturated compounds containing a nucleophilic group is chosen such that when the copolymers are reacted chain extended and or branched, un-crosslinked polymers are prepared. Equivalents as used in this context means the number of electrophilic groups or nucleophilic groups available to react with the other. To form the chain extended and or branched copolymers the nucleophilic groups react electrophilic groups. The extent of reaction and chain extension, branching and crosslinking is controlled by the amount of the lowest amount of the nucleophilic or electrophilic groups. The amount of nucleophilic groups may be the limiting reactive group. The amount of electrophilic groups may be the limiting reactive group. The equivalents ratio of electrophilic groups to nucleophilic groups may be about 0.1:1.0 or greater, about 0.3:1.0 or greater or about 0.5:1.0 or greater. The equivalents ratio of electrophilic groups to nucleophilic groups may be about 10:1 or less, about 4:1 or less or about 2:1 or less.

The polymers which are crosslinked are based on one or more copolymers of one or more vinylidene aromatic monomers and one or more unsaturated compounds containing one or more nucleophilic groups or such copolymers chain extended by the one or more copolymers of one or more vinylidene aromatic monomers and one or more unsaturated compounds containing a electrophilic group. The copolymers are prepared such that the concentration of nucleophilic groups is selected such that when reacted with one or more metal salts or metal oxides the copolymers are crosslinked to provide the advantageous properties described herein.

The concentration of the nucleophilic groups on the one or more copolymers of one or more vinylidene aromatic monomers and one or more unsaturated compounds containing a nucleophilic groups is chosen such that based on the concentration of metal salts or metal oxides which are to be reacted with the copolymers crosslinked polymers are prepared. The equivalents ratio of metal salts to the nucleophilic groups on the copolymers of one or more vinylidene aromatic monomers and one or more unsaturated compounds containing nucleophilic groups is chosen such that when the components are reacted crosslinked polymers are prepared. Equivalents as used in this context means the number of nucleophilic groups available to react with the metals. To form the crosslinked polymers anions based on the nucleophilic groups react with the cations formed from the metal salts that have valences of two or greater or the acids complex with metal oxides. The extent of reaction and crosslinking is controlled by the amount of the lowest amount of the nucleophilic groups or metal oxide or metal salts present. The amount of nucleophilic groups may be the limiting reactive group. The amount of metal salts or metal oxides groups may be the limiting reactive group. The equivalents ratio of metal salts or metal oxides to nucleophilic groups may be about 1:40 or greater, about 1:20 or greater or 1:10 or greater. The equivalents ratio of metal salts or metal oxides to nucleophilic groups may be about 40:1 or less, about 20:1 or less or 10:1 or less.

The one or more copolymers of one or more vinylidene aromatic monomers and one or more unsaturated compounds containing nucleophilic groups may be both chain extended and/or branched and crosslinked. Chain extending with the one or more copolymers of one or more vinylidene aromatic monomers and one or more unsaturated compounds containing electrophilic groups and crosslinking using metal salts or oxides may be performed simultaneously or in any sequence. If performed in sequence a sufficient amount of nucleophilic groups should remain after the first step to perform the second step. If performed simultaneously then the equivalents of metal salt or metal oxide and the electrophilic groups present should be chosen to allow both reactions to proceed. The copolymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are herein incorporated by reference. The monomer may correspond to the formula:

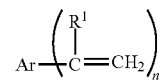

wherein $R^1$ is separately in each occurrence hydrogen or methyl; and

Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the copolymers in a sufficient amount such that the polymer exhibits the advantageous properties associated with polymers of vinylidene substituted aromatic monomers, for instance polystyrene. The advantageous properties of polymers of vinylidene substituted monomers include processability, stiffness, and thermal stability. The copolymers of one or more vinylidene aromatic monomers and one or more unsaturated compounds containing a nucleophilic group may contain vinylidene substituted aromatic monomers in an amount of about 90 percent by weight of the copolymers or greater, about 95 percent by weight or greater or about 96 percent by weight or greater. The copolymers of one or more vinylidene aromatic monomers and one or more unsaturated compounds containing a nucleophilic group may contain vinylidene substituted aromatic monomers in an amount of about 99.98 percent by weight of the polymerizable compositions or copolymers or less, about 99.97 percent by weight or less or about 99.96 percent by weight or less. The copolymers one or more copolymers of one or more vinylidene aromatic monomers and one or more unsaturated compounds having electrophilic groups may contain vinylidene substituted aromatic monomers in an amount of about 40 percent by weight of the polymerizable compositions or copolymers or greater, about 50 percent by weight or greater or about 60 percent by weight or greater. The one or more copolymers of one or more vinylidene aromatic monomers and one or more unsaturated compounds having electrophilic groups may contain vinylidene substituted aromatic monomers in an amount of about 90 percent by weight of the polymerizable compositions or copolymers or less, about 85 percent by weight or less or about 80 percent by weight or less. The recited amounts may relate to the amounts of vinylidene substituted aromatic monomers.

The compositions may contain branching agents commonly used in vinylidene aromatic based polymers. The branching agents may be vinylidene substituted aromatic monomers having 2 or more vinylidene groups. Other branching agents may include other difunctional and in general multifunctional (functionality >2) monomers, multifunctional initiators and multifunctional chain transfer agents and the like. The branching agents may be present in polymerizable compositions in an amount of about 0.001 percent by weight of the composition or greater, about 0.002 percent by weight or greater or about 0.003 percent by weight or greater. The branching agents may be present in polymerizable compositions in an amount of about 0.5 percent by weight of the composition or less, about 0.2 percent by weight or less or about 0.1 percent by weight or less.

The one or more unsaturated compounds containing nucleophilic groups may contain any nucleophilic group that can form an anion that is capable of reacting with a cation formed from a metal salt or metal oxide to form a crosslink between copolymer chains.

The one or more unsaturated compounds containing one or more nucleophilic groups may contain one nucleophilic group. The copolymers may contain more than one different nucleophilic group or may contain only one species of nucleophilic group. The copolymers may be prepared from more than one unsaturated compound each containing different type of nucleophilic group. The copolymers may be prepared from one species of unsaturated compounds each containing the same nucleophilic group. The nucleophilic groups may be pendant from the chain of the copolymer. The one or more unsaturated compounds containing nucleophilic groups may contain any nucleophilic group that reacts with an electrophilic group under the conditions described herein and/or a metal salt or oxide or cation formed therefrom. Nucleophilic group as used herein is a group which donates an electron pair to make a covalent bond. Exemplary nucleophilic groups include carboxylic acid, alcohol, phenol, amine, aniline, imidazole, tetrazole, thiol, boronic acid, glycol, hydrazine and hydroxyl amine groups. The one or more nucleophilic groups may be acids including carboxylic acids, unsaturated aromatic acids, sulfonic acids, phosphorous based acids, boronic acids, or mixtures thereof. Nucleophilic groups may be carboxylic acid groups. The one or more unsaturated compounds containing nucleophilic groups may be (meth)acrylic acids, (meth)acrylates, hydroxyalkyl methacrylates, and the like. The one or more unsaturated compounds containing nucleophilic groups may be methacrylic acid and or acrylic acid.

The one or more unsaturated compounds containing electrophilic groups may contain any electrophilic group that reacts with a nucleophilic group under the conditions described herein. Electrophilic group as used herein is a group which receives an electron pair to form a covalent bond. Exemplary electrophilic groups include epoxide, anhydride, imide, ester, acyl halide, acyl nitrile, aldehyde, ketone, isocyanate and isothiocyanate groups. Electrophilic groups may be epoxide groups. The one or more unsaturated compounds containing electrophilic groups may be glycidyl (meth)acrylates, and the like.

The copolymers disclosed herein may further comprise one or more (meth)acrylates. (Meth)acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

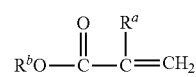

wherein Ra is separately in each occurrence H or —CH$_3$; and R$^b$ may be a C$_1$ to C-$_{30}$ alkyl group or C$_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl(meth)(acrylate) and hexyl(meth)acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The copolymers disclosed herein contain (meth)acrylates in an amount of about 0 percent by weight of the copolymers or greater, about 1 percent by weight or greater or about 2 percent by weight or greater. The polymerizable compositions and copolymers disclosed herein contain (meth)acrylates in an amount of about 20 percent by weight of the copolymers or less, about 15 percent by weight or less, about 10 percent by weight or less, about 8 percent by weight or less or about 5 percent by weight or less.

The copolymers may further comprise one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the copolymers to enhance the glass transition temperature, transparency, chemical resistance and the like. The copolymers disclosed herein may contain one or more unsaturated nitriles in an amount of about 0 percent by weight of the copolymers or greater, about 1 percent by weight or greater or about 2 percent by weight or greater. The copolymers disclosed herein may contain one or more unsaturated nitriles in an amount of about 40 percent by weight of the copolymers or less, about 35 percent by weight or less, about 30 percent by weight or less or about 20 percent by weight or less.

Other vinyl monomers may also be included in the copolymers, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like. These additional comonomers can be incorporated into the composition in several ways including, interpolymerization with the vinylidene substituted aromatic containing copolymer and/or polymerization into polymeric components which can be combined, for example blended into the matrix. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions disclosed herein contain the copolymer in an amount of about 0.5 percent by weight of the compositions or greater or 50 percent by weight of the compositions or greater. The compositions disclosed herein contain copolymer in an amount of about 99.5 percent by weight of the compositions or less, 90 percent by weight of the compositions or less, 80 percent by weight of the compositions or less or 50 percent by weight of the compositions or less. Compositions, formulated compositions, as used in this context are the formulated compositions containing all of the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight average molecular weight of at least about 100 kilogram per mole (kg/mole)—or a weight average molecular weight of at least about a 300 kg/mole. The diene rubber may have a weight-average molecular weight equal to or less than about 900 kg/mole or a weight average molecular weight equal to or less than 600 kg/mole. The diene rubber having a solution viscosity of at least 10 centiStokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01 by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (µm), equal to or greater than about 0.1 micrometers and about 0.5 micrometers. The average particle size of the rubber particles may be equal to or less than about 15 micrometers, equal to or less than about 10 micrometers, equal to or less than about 7 micrometers, or equal to or less than about 4 micrometers.

The disclosed compositions may also optionally contain one or more additives that are commonly used in compositions of this type. Such additives of this type include, but are not limited to: ignition resistant additives, stabilizers, colorants, antioxidants, antistats, silicon oils, flow enhancers, mold releases, etc. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof.

If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Disclosed are various techniques for producing the copolymers. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylene-bisstearamide, dialkyladipates, polydimethylsiloxane, or other lubricants or release agents that increases the processability of the product can be added in one or more location throughout the polymerization, devolatization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to cross-link the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. Generally, conversion (also sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

To synthesize rubber-modified copolymers with high performance by the mass process, four aspects are important among many others. These aspects are grafting of the rubber substrate prior to phase inversion, rubbery domain and/or particle formation or sizing during phase inversion, building molecular weight and molecular weight distribution of the matrix, and cross-linking of the rubber particle at the completion point of the mass polymerization. Alternatively, a combination of mass and suspension polymerization techniques are employed. Using these techniques, following phase inversion and subsequent size stabilization of the rubber particles, the partially polymerized product can be suspended with or without additional monomers in an aqueous medium which contains a polymerized initiator and polymerization subsequently completed. The rubber-modified copolymer is subsequently separated from the aqueous medium by acidification, centrifugation or filtration. The recovered product is then washed with water and dried.

A polymer's molecular weight is directly related to the entanglement effects contributing to its rheological and physical properties. The molecular weight of the matrix copolymer produced in the grafting reactor during the production of the rubber-modified vinylidene aromatic substituted copolymer can be adjusted by the addition of a suitable chain transfer agent. Chain transfer agents, or molecular weight regulators, are substances which can undergo atom or group transfer or an addition-elimination. Organic molecules with labile hydrogens and are well known, for example, alpha-methyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinoline. Also transition metal complexes as cobalt(II) porphyrin complexes can be used as transfer agent. Chain transfer agents are added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture.

The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization (in other words, at a time where the percent solids for the reaction mixture is equal to the weight percent rubber) in a first amount equal to or greater than 0.001 weight percent, from about 0.002 to about 0.1 weight percent, or from about 0.003 to about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, among other things, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The weight average molecular weight of the copolymer may be about 100,000 g/Mole or greater, about 120,000 g/Mole or greater or about 140,000 g/Mole or greater. The weight average molecular weight of the copolymer may be about 400,000 g/Mole or less, about 350,000 g/Mole or less or about 325,000 g/Mole or less. Molecular weight is determined by gel permeation chromatography using polystyrene standards.

The process may be performed in the presence of a radical initiator. Any radical initiator that enhanced the formation of the copolymers may be used. Exemplary classes of initiators include free radical initiators such as peroxide and azo compounds which will accelerate the polymerization of the vinyl aromatic monomer. Exemplary initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization. Initiators may be employed in a range of concentrations dependent on a variety of factors including the specific initiators employed, the desired levels of polymer grafting and the conditions at which the mass polymerization is conducted, such as from 50 to 2000, preferably from 100 to 1500, parts by weight of the initiator are employed per million parts by weight of monomers. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

The chain extended and/or branched polymers may be prepared in the presence of a metal salt or metal oxide to facilitate the reaction. The crosslinked polymers may be formed by contact with metal salts or metal oxides. The same metal oxides may be used for both reactions, whether performed separately or in sequence. The one or more metal salts and/or metal oxides include metals having a valence of 2 or greater. The metal may be any metal that is capable of forming 2 or more cationic groups that will form an ionic bond with anions formed from the nucleophilic group of the copolymer or complexing with two nucleophilic groups and/or facilitate the reaction of nucleophilic groups with electrophilic groups to form chain extended and/or branched copolymers. The metal salt may reduce the temperature at which the chain extended and or branched copolymers may be formed. The metal salt may function as a catalyst for the formation of the chain extended and or branched copolymers. Any metal salt that catalyzes or reduces the temperature required for formation of the chain extended and or branched copolymers may be utilized. The metal salt may be the salt of a transition metal, an alkali metal, an alkaline earth metal, a post transition metal or a metalloid. The metal in the salt may be zinc, zirconium, aluminum, calcium, sodium, copper, magnesium or mixtures thereof. The metal in the salt may be zinc. The metal may form a salt with an acetate, carbonate, bicarbonate, methacrylate, fumarate counter ion, or mixtures thereof. The metal may form a salt with an acetate counter ion. The metal salt may be zinc acetate, zinc acetate dihydrate, zinc carbonate, and the like.

The metal salt may be present in a sufficient amount to catalyze or reduce the temperature required for formation of the chain extended and or branched copolymers. The metal salt may be present in the reactive composition disclosed in a mole ratio relative to the one or more vinylidene aromatic monomers and one or more unsaturated compounds containing a nucleophilic group of about 20:1 to about 1:20, about 10:1 to about 10:1 or about 5:1 to about 1:5. The metal salt may be present in the reactive composition in an amount of about 10 ppm or greater based on the weight of the composition, about 50 ppm by weight or greater or about 100 ppm or greater. The metal salt may be present in the reactive composition in an amount of about 5000 ppm by weight or less based on the weight of the composition, about 3000 ppm by weight or less or about 1000 ppm by weight or less.

The metal is used in the form of a salt or oxide. Any salt or oxide may be used which can form cations under reaction conditions for the formation of the crosslinked polymers. The metal may be present in the form of a metal carbonate, metal acetate, metal bicarbonate, metal oxide, metal hydroxide, metal carboxylate, metal acetylacetonate, metal salt of a fatty acid or mixtures thereof. Exemplary metal salts or metal oxides include zinc acetate, zinc oxide, zinc carbonate, zinc hydroxide, zinc stearate, zinc citrate, zirconium acetate, zirconium oxide, aluminum acetate, calcium carbonate, calcium stearate and the like. The metal salt or metal oxide may be present in the reactive composition for forming the crosslinked copolymers in the ratios disclosed hereinbefore. The metal salt or metal oxide may be present in the reactive composition is a sufficient amount to form the crosslinked copolymer. The metal salt or metal oxide may be present in a matrix of a polymer of one or more vinylidene aromatic monomers which can be blended with the copolymer.

The one or more copolymers of one or more vinylidene aromatic monomers and one or more unsaturated compounds containing a nucleophilic group may be present in the reactive composition in an amount of about 85 weight percent or greater based on the weight or the reactive composition, about 90 weight percent or greater, about 95 weight percent or greater, or about 99 weight percent or greater. The one or more copolymers of one or more vinylidene aromatic monomers and one or more unsaturated compounds containing a nucleophilic group may be present in the reactive composition in an amount of about 99.9 weight percent or less based on the weight or the reactive composition, about 99.8 weight percent or less or about 99.7 weight percent or less. The one or more copolymers of one or more vinylidene aromatic monomers and one or more unsaturated compounds containing an electrophilic group may be present in the reactive composition in an amount of about 0.05 weight percent or greater based on the weight or the reactive composition, about 0.1 weight percent or greater or about 0.3 weight percent or greater. The one or more copolymers of one or more vinylidene aromatic monomers and one or more unsaturated compounds containing an electrophilic group may be present in the reactive composition in an amount of about 10 weight percent or less based on the weight or the reactive composition, about 8 weight percent or less or about 5 weight percent or less.

Disclosed is a method of preparing chain extended and or branched copolymers of one or more vinylidene aromatic monomers and one or more unsaturated compounds containing a nucleophilic group. The method may comprise contacting one or more copolymers of one or more vinylidene aromatic monomers and one or more unsaturated compounds containing nucleophilic groups with one or more copolymers of one or more vinylidene aromatic monomers and one or more unsaturated compounds having electrophilic groups under conditions such that chain extended and or branched copolymers of one or more vinylidene aromatic monomers and one or more unsaturated compounds containing nucleophilic groups are prepared. The method may comprise contacting the copolymers in the presence of a metal salt. The amounts of the reactants utilized may be those amounts recited herein before.

The reactants may be contacted using any method wherein chain extended and or branched copolymers of one or more vinylidene aromatic monomers and one or more unsaturated compounds containing nucleophilic groups or crosslinked polymers are prepared. Exemplary methods include melt blending, extrusion, injection molding, foam extrusion, sheet extrusion, and the like. Exemplary methods include melt blending. The temperature for reacting the reactants is selected such that chain extended and or branched copolymers of one or more vinylidene aromatic monomers and one or more unsaturated compounds containing nucleophilic groups are prepared. The reactants may be contacted at a temperature of about 200° C. or greater, or about 220° C. or greater, or about 230° C. or greater. The reactants may be contacted at a temperature of about 260° C. or less, or about 250° C. or less, or about 245° C. or less. The contacting time at the stated temperatures is selected such that chain extended and or branched copolymers of one or more vinylidene aromatic monomers and one or more unsaturated compounds containing nucleophilic groups are prepared. The contacting time of the reactants may be about 0.5 minutes or greater, about 0.6 minutes or greater or about 0.7 minutes or greater. The contacting time of the reactants may be about 10 minutes or less, about 5.0 minutes or less or about 3.0 minutes or less. The reactants may be melt blended in an extruder, mixer, and the like. To facilitate formation of the chain extended and or branched copolymers of one or more vinylidene aromatic monomers and one or more unsaturated compounds containing nucleophilic groups it may be desirable to react the reactants at the specific energy values. The copolymers may be reacted under conditions such that the specific energy values are greater than 400 J/g or 700 J/g.

The reactants may be contacted using any method wherein crosslinked copolymers of one or more vinylidene aromatic monomers and one or more unsaturated compounds containing one or more acid groups are prepared. Exemplary methods include melt blending, extrusion, injection molding, foam extrusion, sheet extrusion, and the like. Exemplary methods include melt blending. The temperature for reacting the reactants is selected such that crosslinked copolymers of one or more vinylidene aromatic monomers and one or more unsaturated compounds containing one or more acid groups are prepared. The reactants may be contacted at a temperature of about 180° C. or greater, or about 200° C. or greater, or about 220° C. or greater. The reactants may be contacted at a temperature of about 260° C. or less, or about 250° C. or less, or about 245° C. or less. The contacting time at the stated temperatures is selected such that crosslinked copolymers of one or more vinylidene aromatic monomers and one or more unsaturated compounds containing one or more acid groups are prepared. The contacting time of the reactants may be about 0.1 minutes or greater, about 0.3 minutes or greater or about 0.5 minutes or greater. The contacting time of the reactants may be about 10 minutes or less, about 5.0 minutes or less or about 3.0 minutes or less. Acids may be generated in the process. Any acids present in the reactor may be removed to drive the reaction to completion. Removal of the acids may be performed by any known method. The reactants may be melt blended in an extruder, mixer, and the like. The final form of the products can be pellets, foam boards, sheets, thermoformed articles, injection molded articles, compression molded articles The crosslinks are reversible. The crosslinks may be reversed before the copolymers are used to facilitate processability. The crosslinks may be reversed by subjecting the crosslinked copolymers to a temperature at which the ionic bonds are broken under shear and/or contacting the composition with excess equivalents of an acid with respect to the crosslinked acid groups such that the crosslinks are reversed. The temperature that the crosslinked copolymer may be exposed to break the crosslinks is any temperature at which the crosslinks are broken or reversed. The copolymers may be exposed to a temperature to break the crosslinks of about 180° C. or greater, or about 190° C. or greater, or about 200° C. or greater. The copolymers may be exposed to a temperature to break the crosslinks at a temperature of about 260° C. or less, or about 255° C. or less or about 250° C. or less. The contacting time at the stated temperatures is selected such that the crosslinks of the copolymers of one or more vinylidene aromatic monomers and one or more unsaturated compounds containing one or more nucleophilic groups with metal salts or metal oxides are broken. The contacting time of the reactants may be about 0.1 minutes or greater, about 0.2 minutes or greater or about 0.3 minutes or greater. The contacting time of the reactants may be about 5 minutes or less, about 4 minutes or less or about 3 minutes or less. The contacting may take place under shear. Shear may be induced in an extruder, mixer or injection molding equipment.

Alternatively, the crosslinks may be reversed by contacting the crosslinked copolymer with an acid that causes the crosslinks to break. Exemplary classes of acids include acetic acid, a carboxylic acid corresponding to the formula CH3(CH2)nCOOH wherein n is separately in each occurrence from 1 to 20, TFA triflouro acetic acid, or mixtures thereof. Exemplary acids include acetic acid. Any ratio of acid to the crosslinked copolymer which causes the crosslinks to be broken may be used. The equivalents ratio of acids to the crosslinked anions of the acid groups is about 1:1 or greater, about 5:1 or greater or about 10:1 or greater. The equivalents ratio of acids to the crosslinked anions of the acid groups is about 10000:1 or less, about 5000:1 or less or about 4000:1 or less. The process is performed until the solution viscosity of the copolymer of one or more vinylidene aromatic monomers and one or more unsaturated acids is substantially the same after the crosslinking is reversed as it is before crosslinking. Substantially the same means the solution viscosity of the copolymer that has undergone reversal of crosslinking is within 5 percent of the original molecular weight or within 1 percent of the original molecular weight.

The final form of the product can be granules useful in further processes, such as forming extruded foams and sheets. Common additives used in the disclosed compositions may include fire retardants, nucleating agents, blowing agents, flow promoters, process aids, fibers, fillers, UV stabilizers, antioxidants, thermal stabilizers, colorants, blends of other polymers, etc. The pellets of the formulated composition may be extruded to form sheets. The sheets may be thermoformed into shaped articles. Alternatively, the formulated compositions may be molded into articles.

Disclosed are structures comprising a sheet having a polymeric layer comprising a composition as disclosed herein. The sheet may have more than one layer and one of the outer most layer may comprise a composition as disclosed herein. The sheet may have three of more layers and one or both of the outer most layers comprises a composition as disclosed herein. The sheets may be formed using by extrusion or multilayer extrusion. Exemplary extrusion and multilayer extrusion process are disclosed in US20110274900A1 or U.S. Ser. No. 10/018,406B2 known references, incorporated herein by reference in their entirety. The sheets may be used as refrigerator liners. Refrigerator liners may be formed by thermoforming the sheets to make the final shape for use in refrigerator liners, processes for thermoforming are disclosed in U.S. Pat. No. 5,716,581A or U.S. Ser. No. 10/018,406B2, incorporated herein by reference in their entirety. Refrigerator liners prepared using the compositions disclosed herein can contain significant amount of recycled content as a result of the sue of these compositions.

The compositions according to the teachings herein may be formed into an article using any forming and/or shaping process. For example, the composition may be formed into an article using a process that includes extrusion, injection molding, blow molding, casting thermoforming, or any combination thereof. The article may be in any form generally used in forming polymer compositions. Without limitation, the article may be a film, a fiber, a sheet structure, a molded object, a blow molded object, an extruded profile, a thermoformed shape, and the like. The compositions may be used in transportation (e.g., automotive) or other non-transportation applications such as industrial applications and appliance applications. The compositions according to the teachings herein may be used in hoses, refrigerator liners and other liners (appliance or otherwise), clothing and footwear components, gaskets, and the like.

Unlike small molecules, the molecular weight of a polymer is generally not one unique value. Rather, a given polymer will have a molecular weight distribution (MWD). The distribution generally will depend on the way the polymer is produced. For polymers the distribution of molecular weight is a function $P(M_i)$, where $P(M_i)$ is the probability, or fraction of molecules having a molecular weight $M_i$. As used herein, molecular weight distribution describes the distribution of the molecular weight of a polymer. The molecular weight of the monovinyl aromatic polymer, refers to the molecular weight of the soluble fraction of the matrix. The molecular weight may be measured using gel permeation chromatography. Different solvents can be used, and a typical solvent is tetrahydrofuran. Polystyrene standards may be used for calibration. The average molecular weight may be characterized by the number average molecular weight (i.e., Mn), the weight average molecular weight (i.e., Mw), the z-average molecular weight (i.e., Mz), Z+1 average molecular weight (i.e., Mz+1), or any combination thereof. The polydispersity index is defined as the ratio of the weight average molecular weight, Mw, and the number average weight, Mn.

In the present disclosure, the polymers of containing one or more vinylidene aromatic monomers may have a Mw of about 150,000 g/mole or more, 200,000 g/mole or more, or 250,000 g/mole or more. The polymers containing one or more vinylidene aromatic monomers may have a Mw of about 400,000 g/mole or less, about 350,000 g/mole or less, or about 300,000 g/mole or less. After branching, crosslinking, or both, the polymers may have a Mz+1 of about 450,000 g/mole or more, about 500,000 g/mole, about 600,000 g/mole or greater, about 650,000 g/mole or more, about 700,000 g/mole or more or about 850,000 g/mole or more, about 1,600,000 g/mole or more, about 1,800,000 g/mole or more, or about 2,000,000 g/mole or more. After branching, crosslinking, or both, the polymers may have a Mz+1 of about 2,500,000 g/mole or less, about 2,300,000 g/mole or less, or about 2,100,000 g/mole or less, about 1,500,000 g/mole or less, about 1,300,000 g/mole or less, or about 1,050,000 g/mole or less. In this disclosure, the polydispersity index may be 2,5 or more.

The amount of rubber crosslinking may be quantified by the light absorbance ratio (LAR). LAR is the ratio of light absorbance for a suspension of the rubber particles in dimethyl formamide (DMF) and the light absorbance for a suspension of the rubber particles in dichloromethane (DCM). LAR may be determined using Brinkmann model PC 800 probe colorimeter equipped with a 450 nm wavelength filter, from Brinkman Instruments Inc. Westbury, New York or equivalent. In a first vial, 0.4 gram sample of rubber-modified copolymer is dissolved in 40 mL DMF. From the first vial, 5 mL of the resulting DMF solution is added to a second vial containing 40 mL of DMF. From the first vial, 5 mL of the resulting DMF solution is added to a third vial containing 20 mL DCM. The probe is zeroed in neat DMF. The absorption of the DMF solution (i.e., $A_{dmf}$) in the second vial and the absorption of the DCM solution (i.e., $A_{DCM}$) in the third vial are determined. The light absorbance ratio is calculated by the following equation:

$$LAR = A_{DMF}/A_{DCM}$$

The composition may exhibit a Brinkman Crosslink Index from 0.6 to 0.8.

Extensional viscosity measurements on the articles or structures herein may be conducted using an Anton Paar MCR 302 rheometer with a SER-3 extensional fixture. Compression moulded samples are prepared by re-compressing injection moulded parts of 4×10 mm to a thickness of 0.6-0.8 mm. From the obtained sheets strips were cut of 10 mm wide and 20 mm long for extensional measurements. The applied extension rate was 0.1 s−1. The extensional viscosity data was measured after 3 seconds. The measurements were performed at 200° C. Elongational Viscosity after 3 seconds at 200 degrees C. may be higher than 75,000 Pa·s.

The gel content of the copolymers herein is a measure for the amount of crosslinked rubber, graft layer, and occlusions. The composition is initially weighted and then heated under nitrogen to a temperature of about 280 degrees C. for about 2 hours to fully cross link the rubber. The composition is then placed in toluene at 25 degrees C. The toluene and soluble polymer is removed. The remaining gel is dried and then reweighed. The gel content is the weight percent of the composition that remains in the dried gel, expressed in units of weight percent. The gel content may be higher than 25 percent, higher than 30 percent, or higher than 35 percent.

The Environmental Stress Crack Resistance is a measure how well the composition can cope with chemical attack from typical foodstuff media in fridges like food oils. The ESCR testing may be conducted according to ISO 22088-3 on injection molded ISO type bars, under 1% flexural strain exposed to a food oil for 10 days. The absolute elongation at rupture, measured according to ISO 527, may be higher than 15%.

ILLUSTRATIVE EMBODIMENTS

1. A composition comprising one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein;
   a) the copolymer being chain extended and or branched by one or more copolymers of one or more vinylidene aromatic monomers and one or more unsaturated compounds having electrophilic groups; or,
   b) or a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides; wherein the composition contains a rubber based impact modifier; and, has a Mz+1 of about 600,000 to about 2,500,00 measured by gel permeation chromatography (GPC) and a gel content of 30 or higher measured as described in the description.

2. A composition according to Embodiment 1 wherein the composition exhibits a Brinkman Crosslink Index of from 0.6 to 0.8 measured by a light absorbance ratio (LAR) quantification method as described in the description.

3. A composition according to Embodiment 1 or 2 wherein the content of the rubber impact modifier is about 6 percent by weight or greater based on the weight of the copolymer and the impact modifier.

4. A composition according to any one of Embodiments 1 to 3 wherein the impact modifier has a volumetric mean particle size of about 2 to about 10 microns measured as described in the description.

5. A composition according to any one of the preceding Embodiments wherein the elongational viscosity after 3 seconds at 200° C. is 75,000 Pa·s or greater measured by an extensional viscosity measurement as described in the description.

6. The composition according to any of the preceding Embodiments wherein one or more copolymers of one or more vinylidene aromatic monomers and one or more one or more unsaturated compounds containing nucleophilic groups, the copolymer having about 0.01 to about 15.0 percent by weight of the one or more unsaturated compounds containing nucleophilic groups wherein the nucleophilic groups are pendant from the copolymer; wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant acid groups with a metal cation having a valence of 2 or greater or ii) complexation between pendant acid groups and metal oxides.

7. The composition according to any one of the preceding Embodiments wherein the one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, the copolymer being chain extended and or branched by one or more copolymers of one or more vinylidene aromatic monomers and one or more unsaturated compounds having electrophilic groups.

8. The composition according to any one of Embodiments 1 to 5, wherein the one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein
a) the copolymer being chain extended and or branched by one or more copolymers of one or more vinylidene aromatic monomers and one or more unsaturated compounds having electrophilic groups in an amount sufficient to react with about 0.02 to about 3.0 percent by weight of nucleophilic groups pendant from the copolymer; and,
b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides.

9. The composition according to any one of the preceding Embodiments wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

10. The composition according to any one of one of the preceding Embodiments wherein the nucleophilic groups are carboxylic acid groups and the electrophilic groups are one or more of epoxide groups.

11. The composition according to any one of the preceding Embodiments wherein the copolymer of one or more vinylidene aromatic monomers and one or more unsaturated compounds containing a nucleophilic group contains from about 0.5 to about 1.5 percent by weight nucleophilic groups.

12. The composition according to any one of the preceding Embodiments wherein the crosslinks i) ionic bonding of anions formed from the pendant acid groups with a metal cation having a valence of 2 or greater or ii) complexation between pendant acid groups and metal oxides are reversible and the weight average molecular weight of the copolymer of one or more vinylidene aromatic monomers and one or more unsaturated acids is substantially the same after the crosslinking is reversed as it is before crosslinking.

13. The composition according to any one of the preceding Embodiments wherein the metal is one or more of transition metals, post transition metals, metalloids or an alkaline earth metals.

14. The composition according to any one of the preceding Embodiments wherein the copolymer of the one or more vinylidene aromatic monomers and one or more unsaturated acids may further comprise one or more (meth)acrylates, unsaturated nitriles or conjugated dienes.

15. The composition according to any one of the preceding Embodiments wherein the equivalents ratio of metal ions to equivalents of anions formed from pendant acid groups on the copolymer is from about 40:1 to about 1:40.

16. The composition according to any one of the preceding Embodiments wherein the nucleophilic groups are carboxylate, carboxylic acid, alcohol, phenol, amine, aniline, imidazole, tetrazole, thiol, boronic acid, glycol, hydrazine or hydroxyl amine groups.

17. The compositions according to any one of any one of the preceding Embodiments wherein the one or more nucleophilic groups are unsaturated acids which comprise carboxylic acids, unsaturated aromatic acids, sulfonic acids, phosphorous based acids, boronic acids, or mixtures thereof.

18. The composition according to any one of the preceding Embodiments comprising from about 20 to about 99.5 percent by weight of the copolymer and from about 6 to about 50 percent by weight of the impact modifier based on the weight of the composition.

19. A structure comprising a sheet having a polymeric layer comprising a composition according to any one of the preceding Embodiments.

20. A structure according to Embodiment 19 wherein the sheet has more than one layer and one of the outer most layer comprises a composition according to any one of the preceding Embodiments.

21 A structure according to Embodiment 19 or 20 wherein the sheet has three of more layers and one or both of the outer most layers comprises a composition according to any one of the preceding Embodiments.

ILLUSTRATIVE EXAMPLES

The following examples are provided to illustrate the disclosed polymers and processes, but are not intended to limit the scope thereof. All parts and percentages are by weight unless otherwise indicated. Branching has been introduced to high impact polystyrene either during its polymerization in the reactor or later by a melt blending step.

Ingredients
Blend 1 is reference high impact polystyrene without branching.
Blend 2 is branched high impact polystyrene.
Blend 3 is acrylic acid modified high impact polystyrene 1 without branching.
Blend 4 is acrylic acid modified high impact polystyrene 2 without branching.
Blend 5 is a branched acrylic acid modified high impact polystyrene melt blended at a higher specific energy with 0.4 percent by weight of a polystyrene copolymer having pendant epoxide groups and 150 ppm Zinc acetate.

Blend 6 is a branched acrylic acid modified high impact polystyrene melt blended at a lower specific energy with 0.4 percent by weight of a polystyrene copolymer having pendant epoxide groups and 150 ppm Zinc acetate.

Blend 7 is a branched high impact polystyrene, with MFR, % rubber, RPS and Brinkmann Crosslink data close to the reference Blend 1

TABLE 1

|  | Units | Blend 1 | Blend 2 | Blend 3 | Blend 4 | Blend 5 | Blend 6 | Blend 7 |
| --- | --- | --- | --- | --- | --- | --- | --- | --- |
| MFR | g/10' | 2.8 | 2.6 | 3.3 | 3.8 | 3.5 | 3.1 | 2.8 |
| % rubber | % | 7.7 | 6.8 | 7.7 | 7.9 | 7.9 | 7.9 | 7.9 |
| RPS*** | micron | 6.1 | 7.5 | 6.8 | 6.5 | 5.7 | 6.5 | 6.3 |
| Mw | Da | 195,900 | 227,400 | 184500 | 191,000 | 233,100 | 259,000 | 233,200 |
| Mz + 1 | Da | 454,000 | 651,000 | 447300 | 434,000 | 956,200 | 1,004,000 | 711,500 |
| MWD |  | 2.19 | 2.63 | 2.30 | 2.23 | 2.97 | 3.01 | 2.71 |
| Acrylic acid | ppm | 0 | 0 | 10,000 | 500 | 500 | 500 | 0 |
| Brinkmann Crosslink data |  | 0.65 | 0.71 | 0.75 | 0.67 | 1.03 | 0.75 | 0.69 |
|  | MPa |  |  |  |  |  |  |  |
| Elong. Visc.* | Pa · s | 74,700 | 90,800 | 62,500 | 66,000 | 79,500 | 102,000 | 92,300 |
| Elong. Visc.** | Pa · s | 53,600 | 72,100 | 41,700 | 40,000 | 90,200 | 251,700 | 60,900 |

Figure 2:
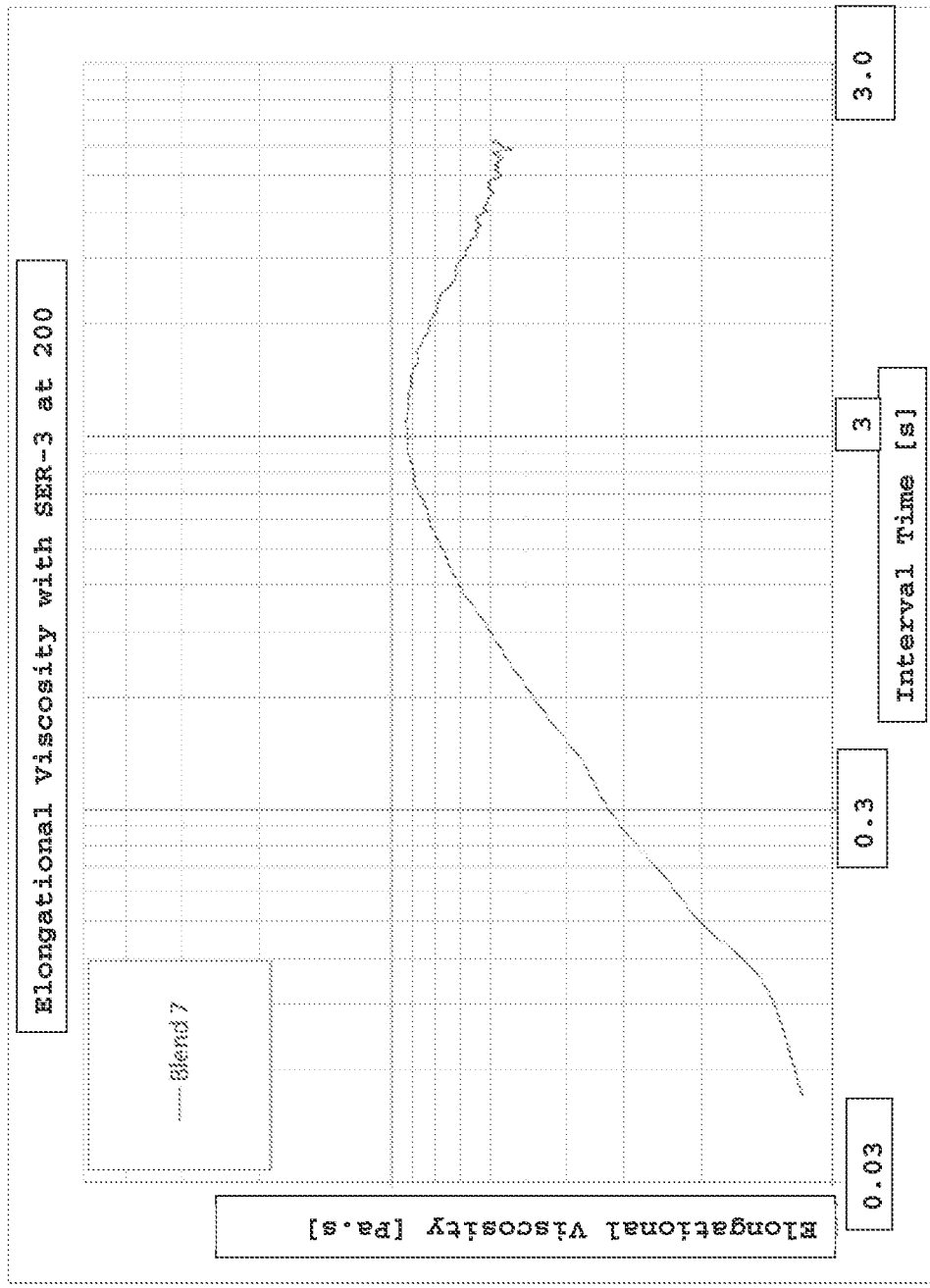
FIG. 2 is a graph of an additional blend of polymer showing elongation viscosity curve at 200 degrees C.

*After 3 seconds at 200 deg C., derived from FIG. 1 and FIG. 2
**After 12 seconds at 200 deg C., derived from FIG. 1 and FIG. 2
***Rubber Particle Size microns, volumetric mean.

TABLE 2

|  | Units | Blend 1 | Blend 7 |
| --- | --- | --- | --- |
| Elongation at Rupture**** | % | 5.5 | 36.7 |

****After 10 days exposure to corn oil under 1% flexural strain

CONCLUSION

Branched high impact polystyrene samples Blend 2, Blend 5 and Blend 6 and Blend 7 resulted in significantly higher elongational viscosities at 3 seconds compared to non-branched refence polymer Blend 1 or acrylic acid containing non-branched polymers Blend 3 and Blend 4. (Table 1)

Branched Blend 7 results in substantially better Environmental Stress Crack Resistance against food oil (corn oil) compared to non-branched reference polymer Blend 1 (Table 2)

What is claimed is:

1. A composition comprising one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein;
   a) the copolymer is chain extended and or branched by one or more copolymers of one or more vinylidene aromatic monomers and one or more unsaturated compounds having electrophilic groups; or,
   b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant nucleophilic groups and metal oxides;
   wherein the composition contains a rubber based impact modifier; and,
   has a Mz+1 of about 600,000 to about 2,500,00 measured by gel permeation chromatography (GPC) and a gel content of 30 or higher measured as described in the description.

2. A composition according to claim 1 wherein the composition exhibits a Brinkman Crosslink Index of from 0.6 to 0.8.

3. A composition according to claim 1, wherein the content of the rubber impact modifier is about 6 percent by weight or greater based on the weight of the copolymer and the impact modifier.

4. A composition according to claim 1, wherein the impact modifier has a volumetric mean particle size of about 2 to about 10 microns greater measured by an extensional viscosity measurement as described in the description.

5. A composition according to claim 1, wherein the elongational viscosity after 3 seconds at 200° C. is 75,000 Pas or greater measured by an extensional viscosity measurement as described in the description.

6. The composition according to claim 1, wherein one or more copolymers of one or more vinylidene aromatic monomers and one or more one or more unsaturated compounds containing nucleophilic groups, the copolymer having about 0.01 to about 15.0 percent by weight of the one or more unsaturated compounds containing nucleophilic groups wherein the nucleophilic groups are pendant from the copolymer; wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant nucleophilic groups with the metal cation having a valence of 2 or greater or ii) complexation between the pendant nucleophilic groups and the metal oxides.

7. The composition according to claim 1, wherein the one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, the copolymer being chain extended and or branched by one or more copolymers of one or more vinylidene aromatic monomers and one or more unsaturated compounds having electrophilic groups.

8. The composition according to claim 1, wherein the one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein
  a) the copolymer being chain extended and or branched by one or more copolymers of one or more vinylidene aromatic monomers and one or more unsaturated compounds having electrophilic groups in an amount sufficient to react with about 0.02 to about 3.0 percent by weight of nucleophilic groups pendant from the copolymer; and,
  b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with the metal cation having a valence of 2 or greater or ii) complexation between the pendant nucleophilic groups and the metal oxides.

9. The composition according to claim 1, wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

10. The composition according to claim 9, wherein the nucleophilic groups are carboxylic acid groups and the electrophilic groups are one or more of epoxide groups.

11. The composition according to claim 1, wherein the crosslinks i) ionic bonding of anions formed from the pendant nucleophilic groups with the metal cation having a valence of 2 or greater or ii) complexation between the pendant nucleophilic groups and the metal oxides are reversible and the weight average molecular weight of the copolymer of one or more vinylidene aromatic monomers and the one or more unsaturated acids is substantially the same after the crosslinking is reversed as it is before crosslinking.

12. The composition according to claim 1, wherein the metal cation and the metal oxides are one or more of transition metals, post transition metals, metalloids or an alkaline earth metals.

13. The composition according to claim 1, wherein the equivalents ratio of metal ions to equivalents of anions formed from pendant nucleophilic groups on the copolymer is from about 40:1 to about 1:40.

14. A structure comprising a sheet having a polymeric layer comprising a composition comprising one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein;
  a) the copolymer is chain extended and or branched by one or more copolymers of one or more vinylidene aromatic monomers and one or more unsaturated compounds having electrophilic groups; or,
  b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant nucleophilic groups and metal oxides;
  wherein the composition contains a rubber based impact modifier; and,
  has a $Mz+1$ of about 600,000 to about 2,500,00 measured by gel permeation chromatography (GPC) and a gel content of 30 or higher measured as described in the description.

15. A structure according to claim 14 wherein the sheet has more than one layer and one of the outer most layer comprises a composition according to any one of the preceding claims.

16. The composition according to claim 14, wherein one or more copolymers of one or more vinylidene aromatic monomers and one or more one or more unsaturated compounds containing nucleophilic groups, the copolymer having about 0.01 to about 15.0 percent by weight of the one or more unsaturated compounds containing nucleophilic groups wherein the nucleophilic groups are pendant from the copolymer; wherein a portion of the chains of the copolymer of one or more vinylidene aromatic monomers and one or more unsaturated acids are crosslinked with other chains of the copolymer of one or more vinylidene aromatic monomers and one or more unsaturated acids by i) ionic bonding of anions formed from the pendant nucleophilic groups with a metal cation having a valence of 2 or greater or ii) complexation between pendant nucleophilic groups and metal oxides.

17. The composition according to claim 14, wherein the one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, the copolymer being chain extended and or branched by one or more copolymers of one or more vinylidene aromatic monomers and one or more unsaturated compounds having electrophilic groups.

18. The composition according to claim 14, wherein the one or more copolymers of one or more vinylidene aromatic monomers and one or more unsaturated compounds containing nucleophilic groups, the copolymer having on average about 0.01 to about 15.0 percent by weight of nucleophilic groups pendant from the copolymer, wherein
  a) the copolymer being chain extended and or branched by one or more copolymers of one or more vinylidene aromatic monomers and one or more unsaturated compounds having electrophilic groups in an amount sufficient to react with about 0.02 to about 3.0 percent by weight of nucleophilic groups pendant from the copolymer; and,
  b) a portion of the chains of the copolymer of one or more vinylidene aromatic monomers and one or more nucleophilic groups are crosslinked with other chains of the copolymer of one or more vinylidene aromatic monomers and one or more nucleophilic groups by i) ionic bonding of anions formed from the pendant nucleophilic groups with a metal cation having a valence of 2 or greater or ii) complexation between pendant acid groups and metal oxides.

19. The composition according to claim 14, wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

20. The composition according to claim 19, wherein the nucleophilic groups are carboxylic acid groups and the electrophilic groups are one or more of epoxide groups.

* * * * *